(No Model.)
E. J. McCLELLAN.
MILLING MACHINE.
No. 525,792. Patented Sept. 11, 1894.
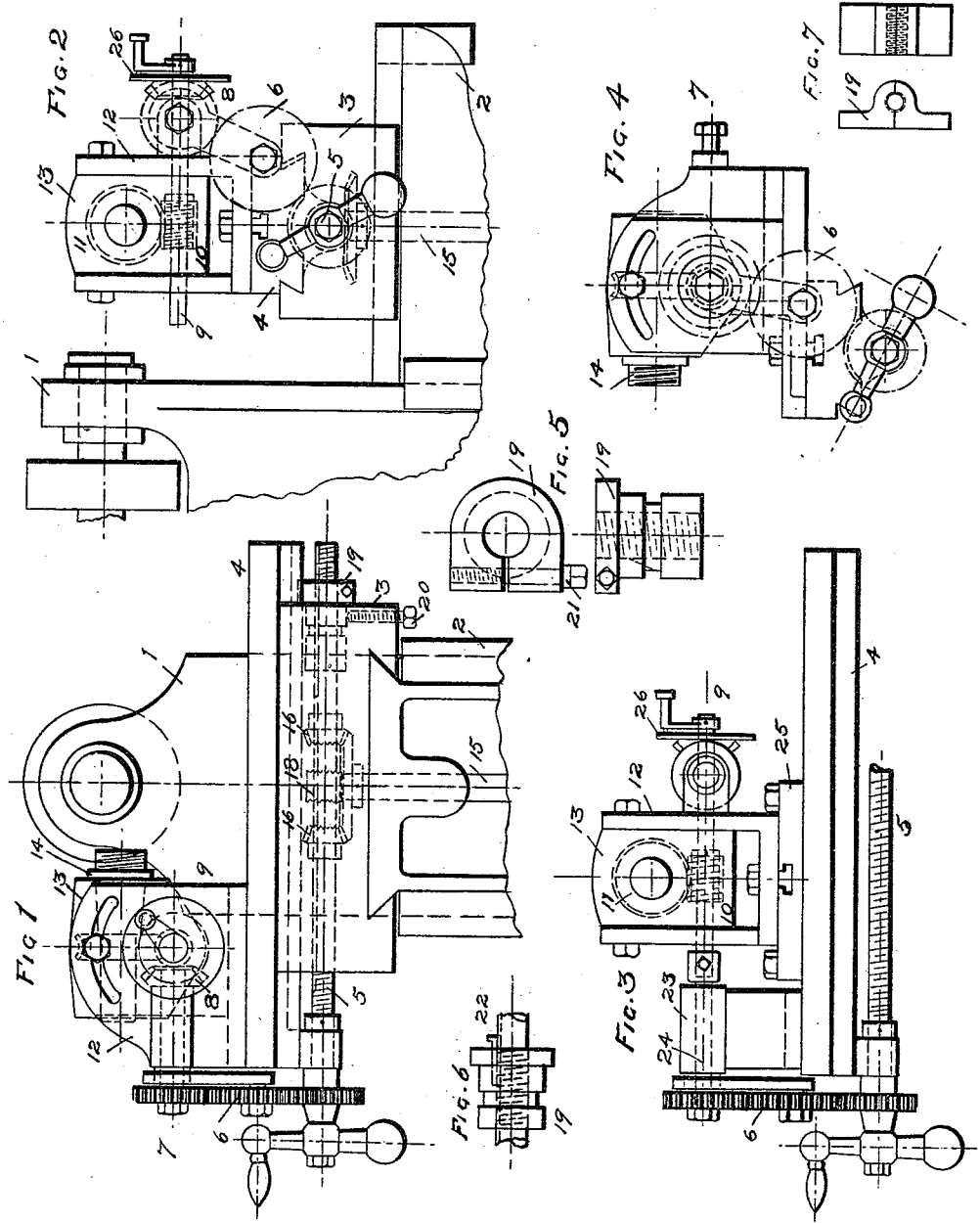
WITNESSES
M. E. Barnett.
C. H. McClellan
INVENTOR
Edward Joseph McClellan

UNITED STATES PATENT OFFICE.

EDWARD JOSEPH McCLELLAN, OF NEW YORK, N. Y.

MILLING-MACHINE.

SPECIFICATION forming part of Letters Patent No. 525,792, dated September 11, 1894.

Application filed October 20, 1893. Serial No. 488,732. (No model.)

*To all whom it may concern:*

Be it known that I, EDWARD JOSEPH MC-CLELLAN, a citizen of the United States, residing at New York, in the county of New York and State of New York, have invented an Improvement in Milling-Machines, of which the following is a specification, reference being had to the accompanying drawings.

Figure 1 is a front view, showing column of machine and slide carrying dividing head. Fig. 2 is an end view of the same. Fig. 3 is a view of the slide with the dividing head set around at right angles. Fig. 4 is an end view of same. Fig. 5 is an enlarged view of the nut on the table feed screw. Fig. 6 is a view of another form of the same nut, as is also Fig. 7.

Only enough of the milling machine has been shown to make clear the improvement and the general connection. Adjustable on the front of the column is a knee (2). On the top of the knee is mounted the block (3) which is adjustable in and out on the knee, and carried in block (3) is the slide (4) which carries the dividing head (12—13). The slide (4) is fed by the screw (5) which passes through nut (19) held in block (3). The screw (5) carries the bevels (16—17) which are loose on the screw and driven by means of the clutch (18). The bevels (16—17) are driven by the large bevel gear carried on shaft (15) to which power is applied. The screw (5) drives the spindle (14) of the dividing head by means of the train of gears (6), shaft (7), bevels (8), shaft (9), worm and worm gear (10—11). The foregoing parts are common to most universal milling machines and the present improvement consists in making the nut (19) so that it can revolve with the screw (5) and thus permit the screw to act as a driving shaft to spindle (14) in the dividing head for circular milling, without at the same time giving any movement to the slide (4).

The second part of the improvement consists in the arrangement for driving the dividing head spindle (14) when the head is set around at right angles on the slide. On the ordinary universal milling machine, the block (3) carrying the slide (4) is free to swivel around to match the angle of the spiral being cut and is not mounted directly on the knee but for the sake of simplicity has not been shown so on the drawings. For ordinary work the nut (19) is bound in the block (3) and prevented from turning by means of the binder screw (20). When so bound the slide (4) moves along when the screw turns. When the binder screw (20) is slacked off, the nut (19) is made to rotate with the screw by means of the binder screw (21) as shown in Fig. 5 or by means of a key as shown in Fig. 6, the screw 5 being splined for the clutch (18). The same result could be obtained by removing the nut (19) at will, or using a clamp nut, as on a lathe carriage, shown in Fig. 7. To provide for driving the head when set around at right angles the end of the worm shaft (9) is extended as shown, on the end opposite from dial and pointer (26). When set around at right angles the head is mounted on a plate (25) and to connect with shaft (9) there is a bracket (23) carrying shaft (24) which connects with the train of gears (6) on the outer end and on the inner end has an enlarged head which fits over the end of shaft (9) and is clamped to it by set screws and can be unclamped when necessary for indexing the spindle (14). When connected as shown the extreme center distance of the gearing (6) can be kept the same as when the head is straight. Of course the head can be driven when set around at right angles by connecting to the end of shaft (7) with an auxiliary pair of bevels and a short shaft but then the center distance of the gearing (6) would be much greater unless the head were set in toward the face of the column (1), thus reducing the available room. With the nut (19) clamped in the block (3) and the head set around at right angles and connected to screw (5) by gearing (6), bracket (23) and shaft (24), cams having a regular spiral rise can be milled, and this arrangement is specially available with the milling machine patented to me July 25, 1893, No. 502,131, in which a rotating differential nut is used and which admits of cutting fine pitches.

There are various forms of the connection to the rear end of the worm shaft (9) and I do not bind myself to use any particular form.

What I claim is—

1. The combination in a milling machine, of a slide, a work spindle carried by the slide, a feed screw and nut to feed the slide, gearing connecting said screw with the spindle carried by the slide, and means for clamping the nut on the screw or releasing the same from the screw, whereby the screw may act as a driving shaft independent of the slide, substantially as described.

2. The combination in a milling machine, of a dividing head with a dividing worm shaft having provision for driving from either end of said shaft at will, and gearing for connecting said worm shaft with the feed screw of the table on which the dividing head is mounted, substantially as described.

EDWARD JOSEPH McCLELLAN.

Witnesses:
C. H. McCLELLAN,
M. E. BARNETT.